United States Patent
Kim

(10) Patent No.: US 10,414,897 B2
(45) Date of Patent: Sep. 17, 2019

(54) MULTIFUNCTIONAL CLAY COMPOSITION

(71) Applicant: Hak Jae Kim, Seoul (KR)

(72) Inventor: Hak Jae Kim, Seoul (KR)

(*) Notice: Subject to any disclaimer, the term of this patent is extended or adjusted under 35 U.S.C. 154(b) by 146 days.

(21) Appl. No.: 15/400,918

(22) Filed: Jan. 6, 2017

(65) Prior Publication Data

US 2018/0037712 A1  Feb. 8, 2018

(30) Foreign Application Priority Data

Aug. 3, 2016 (KR) .................. 10-2016-0099032

(51) Int. Cl.
| | |
|---|---|
| *C08K 3/34* | (2006.01) |
| *C08K 3/26* | (2006.01) |
| *C08L 29/04* | (2006.01) |
| *B43K 19/00* | (2006.01) |
| *B43K 19/02* | (2006.01) |
| *B43K 19/18* | (2006.01) |
| *C09D 13/00* | (2006.01) |
| *C08L 1/00* | (2006.01) |
| *C08J 3/215* | (2006.01) |

(52) U.S. Cl.
CPC ............ *C08K 3/346* (2013.01); *B43K 19/003* (2013.01); *B43K 19/02* (2013.01); *B43K 19/18* (2013.01); *C08J 3/215* (2013.01); *C08K 3/26* (2013.01); *C08L 1/00* (2013.01); *C08L 29/04* (2013.01); *C09D 13/00* (2013.01); *C08J 2301/28* (2013.01); *C08J 2329/04* (2013.01); *C08K 2003/265* (2013.01)

(58) Field of Classification Search
CPC .... C08K 3/346; C08K 3/26; C08K 2003/265; B43K 19/003; B43K 19/02; B43K 19/18; C08L 1/00; C08L 29/04; C09D 13/00

USPC ........................................................ 524/445
See application file for complete search history.

(56) References Cited

U.S. PATENT DOCUMENTS

| | | |
|---|---|---|
| 5,395,873 A | 3/1995 | Mizoule |
| 5,916,949 A * | 6/1999 | Shapero .................. C08K 7/16 523/219 |
| 2011/0168054 A1 | 7/2011 | Kim et al. |

FOREIGN PATENT DOCUMENTS

| | | |
|---|---|---|
| GB | 2327086 A | 1/1999 |
| KR | 20020086201 A | 11/2002 |
| KR | 10-0831855 B1 | 5/2008 |
| WO | WO-2015-166859 A1 | 11/2015 |
| WO | WO-2017-035450 A1 | 3/2017 |

OTHER PUBLICATIONS

Extended European Search Report from European Application No. 16200777.7, dated Apr. 6, 2017.

\* cited by examiner

*Primary Examiner* — Josephine L Chang
(74) *Attorney, Agent, or Firm* — Morgan, Lewis & Bockius LLP

(57) ABSTRACT

The present invention relates to a multifunctional clay composition which can be used as a clay capable of performing various functions before drying and which can be used as writing instruments similar to crayons, pastels or colored pencils after drying, and to a process for preparing the same. The multifunctional clay composition may comprise an extender material; a binder; a multifunctional crosslinking agent including a compound having a hydroxyl group of two or more functionality, or forming an ion having a hydroxyl group of two or more functionality in a water solvent; a wax and a pigment.

6 Claims, No Drawings

MULTIFUNCTIONAL CLAY COMPOSITION

TECHNICAL FIELD

The present invention relates to a multifunctional clay composition which can be used as a clay capable of performing various functions before drying and which can be used as writing instruments similar to crayons, pastels or colored pencils after drying, and to a process for preparing the same.

BACKGROUND OF ART

In general, clay compositions, which can be molded in various forms and so are used for children's toys, are widely used and sold. Recently, clay compositions taking various colors are sold in the form of a toy set or the like. Such a toy set comprising these cray compositions is sold in a form containing a plurality of types of clay compositions with several colors, and simple molding tools such as spatula for molding into various shapes.

However, in the case of the clay composition in the form of the toy set, after being used and dried for a certain period of time, it becomes impossible to further mold the composition and thus there is a drawback that the life span of the toy, etc. runs out. That is, after the clay composition is dried, the molding itself becomes difficult, and thus not only its lifetime is relatively short but also it may have other functions or cannot be used for other purposes. Therefore, there is a problem that it has no choice but to be discarded.

In particular, the clay composition is mainly provided in the form of a toy or the like used by children and so there is a need to contain relatively expensive components that are harmless to the human body. Therefore, manufacturing and selling prices are relatively high. Despite these high unit prices, because the life span is relatively short and cannot have other functions or applications, it has become a heavy burden on the consumer standpoint.

Due to the problems of the prior art, it has been considered to develop a composition which can have a longer life span, or which can have other functions or be used in other applications, even after the life span of moldable clay compositions has run out. However, it is true that there is a limit to the development of technologies such as these compositions.

SUMMARY OF THE INVENTION

The present invention provides a multifunctional clay composition which can be used as a clay capable of performing various functions before drying and which can be used as writing instruments similar to crayons, pastels or colored pencils after drying, and a process for preparing the same.

Specifically, the present invention provides a multifunctional clay composition comprising:

an extender material;

a binder containing a crosslinkable water-soluble resin or compound;

a multifunctional crosslinking agent comprising a compound having a hydroxyl group of two or more functionality, or forming an ion having a hydroxyl group of two or more functionality in a water solvent;

a wax; and a pigment.

The present invention provides a process for preparing the multifunctional clay composition, comprising the steps of:

forming a mixture containing an extender material, a binder, a multifunctional crosslinking agent, a wax and a pigment in the presence of a water solvent; and kneading the mixture.

DESCRIPTION OF THE EMBODIMENTS

Hereinafter, the multifunctional clay composition according to a specific embodiment of the present invention, a method for producing the same, and the like will be described in more detail. However, these are presented as one example of the present invention, and the scope of the present invention is not limited thereto, and it would be apparent to those skilled in the art that various modifications and variations can be made to the embodiments within the scope of the invention.

In addition, unless stated otherwise throughout the specification, "comprising" or "containing" refers to including any constituent element (or, constituent component) without a particular limitation, and cannot be interpreted as excluding the addition of other constituent elements (or constituent components).

According to one embodiment of the invention, there is provided a multifunctional clay composition comprising:

an extender material;

a binder containing a crosslinkable water-soluble resin or compound;

a multifunctional crosslinking agent comprising a compound having a hydroxyl group of two or more functionality, or forming an ion having a hydroxyl group of two or more functionality in a water solvent;

a wax; and a pigment.

The present inventors have continued research to extend the practical life span by imparting different functions or uses to the clay composition which can be molded in various forms. As a result, the inventors have found that, by including a crosslinkable water-soluble binder, a certain multifunctional crosslinking agent, a wax, a pigment and the like, it is possible to provide a multifunctional clay composition which can be used as a writing instrument similar to crayons, pastels or colored pencils even after the life span of the moldable clay composition has run out. The present invention has been completed on the basis of such a finding.

More specifically, the above clay composition has a flexibility (or softness) of a predetermined level or higher, similarly to a conventional clay composition, in a state containing a certain amount of moisture before drying, and thus it can be molded in various forms and used as a toy, etc. Such multifunctional clay composition may have a flexibility where the penetration depth measured by PENETROMETER at room temperature and relative humidity of 36% is defined as 50 to 300, or 100 to 200, or 105 to 180, or 110 to 160, which corresponds to a flexibility (penetration depth) equivalent to or slightly lower than that of a conventional clay composition. Therefore, the clay composition according to one embodiment of the invention can be molded in various forms, similarly to a conventional clay composition, in a wet state before drying.

On the other hand, the clay composition according to one embodiment of the invention can have higher hardness, strength and abrasiveness (low friction coefficient) after being used and dried for a predetermined period of time or more, as compared to a conventional clay composition. More specifically, the clay composition according to one embodiment of the invention may have an abrasiveness or the like which is defined as a friction coefficient of 0.35 or less, or 0.25 or less, or 0.2 to 0.25 after being dried at room temperature for 7 days. These abrasion properties are comparable to physical properties that conventional writing instruments such as crayons or pastels have. As such, the clay composition according to one embodiment of the invention may have relatively high hardness and abrasiveness or the like after drying, while as pigments of various colors are included in the clay composition according to one embodiment of the invention, in a state where the composition of one embodiment is once dried and becomes difficult to mold the clay composition, the components such as a pigment might be smeared on a paper or the like from the clay composition due to abrasion and can be used as a writing instrument similar to crayons or crayons or pastels.

As a result, the multifunctional clay composition of one embodiment exhibits a multifunctionality that can be utilized as a writing instrument even after the substantial life span of the moldable clay composition has run out, and thus exhibits a substantially extended life span. In addition, the multifunctional clay composition can provide diverse entertainment for children, a major consumer, and also can greatly reduce a substantial burden of the consumers considering product unit prices.

On the other hand, hereinafter, each component of the multifunctional clay composition of one embodiment will be described in more detail.

The multifunctional clay composition of one embodiment includes a basic extender material. Such extender material can be comprised of the main component which occupies the largest amount in the clay composition of one embodiment together with the binder described below. As such extender material is included, the clay composition of one embodiment can be molded in various forms similarly to previously known various clay compositions in a wet state before drying.

As the extender material, any component that was previously known to be usable in a moldable clay composition can be used without particular limitation. Specific examples thereof may include a clay-based extender material such as a kaolin-based clay, or an inorganic extender material such as talc, mica, calcium carbonate ($CaCO_3$) or magnesium carbonate ($MgCO_3$). However, for the clay composition of one embodiment to have physical properties suitable as a moldable clay composition or to have suitable physical properties comparable to those of a writing instrument after drying, a kaolin-based clay or a calcium carbonate and the like may be suitably used.

The kaolin-based clay is a clay component derived from kaolin minerals that can be naturally taken and may contain a composite oxide of aluminosilicate. The kaolin-based clay may be either used by preparing by methods well known previously or commercially available.

In addition, other types of clay-based extender materials or inorganic extender materials are an extender material that is conventionally known to be usable in the clay composition, and are either used by preparing by a method well known to those skilled in the art or commercially available.

On the other hand, the multifunctional clay composition of one embodiment of the invention includes, as a main component, a binder containing a crosslinkable water-soluble resin or compound together with the clay-based extender material. Such binder is basically included as a component of the clay composition, and cross-linked with a multifunctional crosslinking agent and thus, ensure that the clay composition has an appropriate level of flexibility and viscosity. For example, the binder may have a crosslinkable structure wherein a crosslinkable functional group (e.g., hydroxy group, etc.) is crosslinked through a hydroxyl group of a multifunctional crosslinking agent. Thereby, the binder allows the clay composition to include a crosslinked polymer wherein a plurality of water soluble polymer chains are crosslinked to one another. Therefore, the clay composition can have an appropriate level of flexibility or viscosity and thus it can be used as a clay composition that can be molded in a form containing moisture.

Moreover, after the clay composition has been used and dried for a certain period of time, an appropriate level of moisture is evaporated and removed from the clay composition of one embodiment. The clay composition of one embodiment can exhibit a high level of hardness and abrasiveness (low friction coefficient) or the like. For this reason, a pigment or the like contained in the composition of one embodiment can be smeared on paper or the like from the clay composition due to abrasion. Therefore, the clay composition can be used as a writing instrument similar to crayons, pastels.

On the other hand, as the binder, a cellulose-based polymer previously known to be usable in a clay composition or the like, or any water-soluble resin or compound having a crosslinkable functional group such as a hydroxy group or a (meth)acrylate group can be used without particular limitation. Among them, specific examples of the cellulose-based polymer may include alkylcellulose such as methylcellulose or ethylcellulose; carboxyalkylcellulose such as carboxymethylcellulose; or hydroxyalkylcellulose such as hydroxymethylpropylcellulose. In addition, it is a matter of course that various cellulose-based polymers can used as a binder. Of these, methylcellulose can be suitably used in consideration of the flexibility or moldability of the clay composition before drying, and the compatibility with other components. Further, typical examples of the water-soluble resin or compound having a crosslinkable functional group may include polyvinyl alcohol (PVA)-based polymers. In addition, it is a matter of course that various water-soluble resins, polymers or compounds having a hydroxyl group or the like can be used without particular limitation.

In particular, a polyvinyl alcohol (PVA)-based polymer may be suitably used as the binder so that the binder can form an appropriate crosslinking structure with the multifunctional crosslinking agent so as to have an appropriate level of viscosity or flexibility.

On the other hand, the clay composition of one embodiment includes a predetermined multifunctional crosslinking agent, in addition to the above-mentioned main components. Such a multifunctional crosslinking agent can be a compound containing a hydroxyl group of two or more functionality in the molecular so as to form a crosslinking structure with the above-mentioned binder, or a compound capable of forming an ion having a hydroxyl group of two or more functionality in a water solvent such as water as a compound in the form of a salt or complex.

More specifically, the multifunctional crosslinking agent can be a compound such as boric acid ($B(OH)_3$) to which hydroxyl group of two or more functionality is bonded on the central boron, or a borate-based salt compound or complex forming a borate-based ion in a water solvent. More specific examples of the borate-based salt compounds or complexes may include a borosilicate-based compound, or a borate mineral such as a borax which is represented by the chemical formula of $Na_2B_4O_5(OH)_4 \cdot 8H_2O$ or $Na_2B_4O_7 \cdot 10H_2O$ and capable of being ionized to form tetrahydroxyborate ions or the like.

In addition, it is a matter of course that various multifunctional crosslinking agents having a hydroxyl group of two or more functionality can be used so that the clay composition can have a moldable and appropriate level of viscosity or flexibility or the like by forming a suitable crosslinking structure with the binder.

On the other hand, the clay composition of one embodiment includes a wax as a component for exhibiting suitable hardness or abrasiveness by increasing the basic compatibility between components or the cohesion/adhesion property of the composition, or the concentration of the solid content after drying of the clay composition. As such wax, any wax commonly used in clay compositions can be used, but in a suitable example, one or more waxes selected from the group consisting of a microcrystalline wax, a paraffin wax, a liquid paraffin, a petrolatum, a bees wax, a wool wax, a carnauba wax, a candelilla wax, a PE wax, a PP wax and a synthetic wax may be used. Further, according to one example of the wax, it is a matter of course that a wax composition comprising two or more waxes selected from the above, and a selective additive can also be used.

In addition, the clay composition of one embodiment by itself exhibits various colors, while it includes a pigment such that it can be applied as a writing instrument of various colors in a dried state. As such pigment, any extender pigment or colorant known to be usable in writing instruments such as crayons can be used without particular limitation.

Specific examples of these extender pigments or colorants include carbon black as a black pigment, iron oxide or permanent red 4R as a red pigment, zinc sulfur or cadmium yellow as a yellow pigment, molybdenum orange or cadmium orange as an orange pigment, iron blue or ultramarine blue as a blue pigment. Besides, various extender pigments and colorants can be used.

The clay composition of one embodiment may include the respective components described above, specifically, 10 to 50% by weight of an extender material; 3 to 40% by weight of a binder; 0.05 to 10% by weight of a multifunctional crosslinking agent; 1 to 30% by weight of a wax; and 0.5 to 20% by weight of a pigment, based on the total weight of solids in the clay composition. Depending on the content range of these respective components, the clay composition exhibits a suitable flexibility before drying and thus can be molded in various forms, and also exhibits high hardness and abrasiveness or the like after drying and thus can be suitably used as a writing instrument similar to crayons.

The clay composition of one embodiment is used to dissolve or disperse the above-mentioned respective components in the manufacturing process, and it may further include a water solvent such as water as a liquid medium used for properly controlling the flexibility or viscosity of the clay composition during use. Such a water solvent can be used by easily determining its suitable content range by those skilled in the art, so that the respective components can be properly dissolved/dispersed in the manufacturing process or the use process, and the flexibility of the clay composition can be properly imparted.

On the other hand, the clay composition of one embodiment may further comprise additives including a humectant such as glycerin or propylene glycol, a preservative, a lubricant such as calcium stearate or sodium stearate, in addition to the above-mentioned respective components.

These additives may be contained in conventional amounts depending on the specific composition of the clay composition. For example, the humectant may be contained in an amount of 1 to 10% by weight based on the total composition, the preservative may be contained in an amount of 0.001 to 0.5% by weight, and the lubricant may be contained in an amount of 1 to 20% by weight.

The clay composition of one embodiment can be prepared by a method of mixing the respective components such as an extender material, a binder, a multifunctional crosslinking agent, a wax and a pigment in the presence of a liquid medium such as a water solvent and then further mixing and kneading the mixture in a mixer. In a more specific embodiment, after forming the aqueous solutions of the binder and multifunctional crosslinking agent, respectively, these aqueous solutions and the remaining components can be primarily mixed in a mixer, and the primary mixture is kneaded in a Bowl mixer, for example at a temperature of 40 to 80° C. for 10 to 60 minutes, thereby obtaining the clay composition.

The multifunctional clay composition of one embodiment has a flexibility comparable to that of a conventional clay composition at the time of initial use and thus, it can be suitably used as a clay composition that can be molded in various forms. In addition, the multifunctional clay composition of one embodiment has high strength and hardness after being used and dried for a certain period of time and becomes usable as a writing instrument similar to crayons, and thereby can have multifunction and multipurpose which are not known in the prior art.

As set forth above, the clay composition of the present invention has a flexibility comparable to that of a conventional clay composition and thus can be suitably used as a clay composition which can be molded in various forms, In addition, the multifunctional clay composition of one embodiment has high strength and hardness after being used and dried for a certain period of time and becomes usable as a writing instrument similar to crayons, and thereby can have multifunction and multipurpose which have not been known in the prior art.

That is, the multifunctional clay composition of one embodiment exhibits a multifunctionality that can be utilized as a writing instrument even after a substantial life span of a moldable clay composition have run out, and thus has a substantially extended life span. In addition, the multifunctional clay composition can provide diverse entertainment for children, a major consumer, and also can greatly reduce a substantial burden of the consumers considering product unit prices.

EXAMPLES

Hereinafter, preferred embodiments of the present invention will be described in order to facilitate understanding of the present invention. However, the following examples are for illustrative purposes only and are not intended to limit the scope of the present invention.

Examples 1 to 3: Preparation of Multifunctional Clay Composition

The multifunctional clay compositions of Examples 1 to 3 were prepared in accordance with the following method using the compositions shown in Table 1 below.

First, 20 wt % aqueous solution of polyvinyl alcohol (available from (gl-05/Gohsenol) and 4 wt % aqueous solution of borax (available from Borax/Duksan) were prepared, respectively. 25 ml of polyvinyl alcohol aqueous solution, 4 ml of borax aqueous solution and the other components listed in Table 1 below were put into a mixer and mixed at a speed of 600 rpm for 10 minutes.

The mixture was put into a Bowl mixer and kneaded at a temperature of 60° C. for 20 minutes to prepare the clay compositions of Examples 1 to 3.

TABLE 1

|  | Example 1 | Example 2 | Example 3 |
| --- | --- | --- | --- |
| Extender material | Kaolin clay 30 wt % | Calcium carbonate 30 wt % (available from Oreworld) | Kaolin clay 30 wt % |
| Binder-1 | Ethyl cellulose 10 wt % (available from HECELLOSE/Lotte Fine Chemical) | Ethyl cellulose 10 wt % (available from HECELLOSE/Lotte Fine Chemical) | Carboxy methyl cellulose 10 wt % (available from Maisel/ GL Chem) |
| Binder-2 | PVA aqueous solution 30 wt % (available from gl-05/ Gohsenol) | PVA aqueous solution 30 wt % (available from gl-05/ Gohsenol) | PVA aqueous solution 30 wt % (available from gl-05/ Gohsenol) |
| Wax | Microcrystalline wax 6 wt % (available from DONA/DONGNAM Petrochemical) | Microcrystalline wax 6 wt % (available from DONA/DONGNAM Petrochemical) | Microcrystalline wax 6 wt % (available from DONA/DONGNAM Petrochemical) |
| Calcium stearate | 5.8 wt % (available from DANSUK Industrial) | 5.8 wt % (available from DANSUK Industrial) | 5.8 wt % (available from DANSUK Industrial) |
| Borax aqueous solution | 4 wt % (available from Borax/ Duksan) | 4 wt % (available from Borax/ Duksan) | 4 wt % (available from Borax/ Duksan) |
| Pigment | 6 wt % (available from Yellow 2GS/ Ukseung Chemical) | 6 wt % (available from Yellow 2GS / Ukseung Chemical) | 6 wt % (available from Yellow 2GS/Ukseung Chemical) |
| Propylene glycol | 4 wt % | 4 wt % | 4 wt % |
| Glycerin | 4 wt % | 4 wt % | 4 wt % |
| Preservative | 0.2 wt % | 0.2 wt % | 0.2 wt % |
| Total | 100 wt % | 100 wt % | 100 wt % |

Comparative Example 1: Conventional Clay Composition

A conventional clay composition of the clay product manufactured by Play-Doh was used as Comparative Example 1.

Comparative Example 2: Conventional Crayon Composition

A conventional crayon of yellow chick products manufactured by Donga was used as Comparative Example 2.

The penetration depth and the bending strength after drying of the compositions of Examples 1 to 3 and Comparative Examples 1 to 2 were measured by the following methods and the measurement results were summarized together in Table 2 below.

Penetration Depth:
Test equipment: Penetrometer (J.I.S)
Test conditions: the respective composition samples were added to be filled in the container of a test equipment at room temperature (about 22° C.) and a relative humidity of 36%. After a weight was inserted vertically, the penetration depth was measured for a certain period of time. It shows that the higher the result measured in the penetration test equipment, the higher the penetration depth and flexibility.

Bending Strength:
Test equipment: Small desk type tester (EZ-s)
Test conditions and methods:
First, the respective composition samples were prepared as a bar type specimen having a length of 50 mm, a width of 10 mm, and a thickness of 4 mm. The prepared specimens were dried at room temperature (about 22° C.) for 7 days. The dried specimens were subjected to a bending test under conditions of loading rate of 40 mm/min and three-point bending method (distance between points: 30 mm) in a test equipment. The measurement results were represented in units of load.

The bending strength was measured five times in the above manner, and evaluated by the average value thereof.

Friction Coefficient
For the same dry specimen measuring the bending strength, the friction coefficient (abrasiveness) was measured under the following equipment/conditions.
Test Equipment: Universal Testing Machine
Test speed: 150 mm/min
Load cell: 30N
Average interval: 30 to 120 mm
Vertical load: 500 g
Friction material: paper
Requested testing from Korea Polymer Testing & Research Institute.

TABLE 2

Measurement results of physical properties

|  | Example 1 | Example 2 | Example 3 | Comparative Example 1 | Comparative Example 2 |
| --- | --- | --- | --- | --- | --- |
| Penetration depth | 118 | 115 | 150 | 203 | 0 |
| Bending strength after drying | 1845 gf | 1755 gf | 1820 gf | 1056 gf | Too hard and so measurement of the penetration |

TABLE 2-continued

Measurement results of physical properties

|  | Example 1 | Example 2 | Example 3 | Comparative Example 1 | Comparative Example 2 |
|---|---|---|---|---|---|
| (gf) | | | | | depth was impossible |
| Friction Coefficient | 0.24 | 0.23 | 0.25 | 0.4 | 0.25 |

Referring to Table 2 above, it was confirmed that Examples 1 to 3 exhibited a penetration depth (flexibility) comparable to that of the clay composition of Comparative Example 1 before drying, while they exhibited an abrasiveness (low friction coefficient) comparable to that of the crayon of Comparative Example 2 after drying.

In contrast, it was confirmed that Comparative Example 1 had excessively small abrasiveness (excessively high friction coefficient) after drying and components such as a pigment could not be transferred to a paper or the like due to abrasion, and thus, Comparative Example 2 could not be used as a writing instrument.

What is claimed is:

1. A multifunctional clay composition comprising:
   10 to 50% by weight of an extender material selected from the group consisting of kaolin-based clay, talc, calcium carbonate, magnesium carbonate, and mica;
   3 to 40% by weight of a binder containing a crosslinkable water-soluble resin or compound, wherein the crosslinkable water-soluble resin or compound is a mixture of a cellulose-based polymer and a polyvinyl alcohol (PVA)-based polymer;
   0.05% to 10% by weight of a multifunctional crosslinking agent comprising a compound having a hydroxyl group of two or more functionalities, or forming an ion having a hydroxyl group of two or more functionalities in a water solvent;
   1 to 30% by weight of a wax including one or more waxes selected from the group consisting of a microcrystalline wax, a paraffin wax, a liquid paraffin, a petrolatum, a bees wax, a wool wax, a carnauba wax, a candelilla wax, a polyethylene (PE) wax, a polypropylene (PP) wax and a synthetic wax; and
   0.5 to 20% by weight of a pigment,
   wherein the multifunctional crosslinking agent includes a borate-based salt compound or complex forming a borate-based ion in a water solvent.

2. The multifunctional clay composition according to claim 1 wherein the pigment includes an extender pigment or a colorant.

3. The multifunctional clay composition according to claim 1 wherein the composition further includes one or more additives selected from the group consisting of a humectant, a preservative, a lubricant and a water solvent.

4. The multifunctional clay composition according to claim 1 wherein penetration depth measured by a penetrometer at room temperature and relative humidity of 36% is 50 to 300.

5. The multifunctional clay composition according to claim 1 wherein the composition has a friction coefficient of 0.35 or less after being dried at room temperature for 7 days.

6. A process for preparing the multifunctional clay composition of claim 1 comprising the steps of:
   forming a mixture containing an extender material, a binder, a multifunctional crosslinking agent, a wax and a pigment in the presence of a water solvent; and
   kneading the mixture.

* * * * *